United States Patent [19]

Powell et al.

[11] Patent Number: 5,393,314
[45] Date of Patent: Feb. 28, 1995

[54] HORIZONTAL PASS, MULTIPLE PACKED-BED GAS SCRUBBER

[75] Inventors: Clarence Powell, St. Louis; Duane Powell, Alma, both of Mich.; Ralph F. Strigle, Jr., Akron, Ohio

[73] Assignee: Powell Fabrication & Manufacturing, Inc., St. Louis, Mich.

[21] Appl. No.: 251,604

[22] Filed: May 31, 1994

[51] Int. Cl.⁶ ............................................. B01F 3/04
[52] U.S. Cl. ................................... 55/233; 55/257.1; 261/22; 261/96; 261/97; 261/29
[58] Field of Search ............ 261/97, 96, 29, 94, 261/22, 21; 55/233, 257.1

[56] References Cited

U.S. PATENT DOCUMENTS

| | | | |
|---|---|---|---|
| 522,574 | 7/1984 | Burrows | 261/96 |
| 2,127,645 | 8/1938 | Kinney et al. | 261/94 |
| 2,946,726 | 7/1960 | Markels, Jr. | 261/97 |
| 3,210,914 | 10/1965 | Eckert | 55/233 |
| 3,324,630 | 6/1967 | Teller et al. | 261/22 |
| 3,419,251 | 12/1968 | Eckert | 261/97 |
| 3,686,830 | 8/1972 | Huntington | 55/233 |
| 3,819,813 | 6/1974 | Jones, Jr. et al. | 261/96 |
| 3,874,858 | 4/1975 | Klugman et al. | 55/233 |
| 4,511,379 | 4/1985 | Hauptmann | 55/233 |

FOREIGN PATENT DOCUMENTS 29704  8/1907  Austria ................... 55/233

*Primary Examiner*—Tim Miles

[57] ABSTRACT

A horizontal pass, multiple packed-bed gas scrubber features relatively low pressure drop flow paths for both the gas flow and the scrubbing liquid flow, allowing large scale mass transfer of solute from the gas to the liquid. The scrubber is volumetrically compact, yet possesses extremely high scrubbing efficiency of large gas flow rates. Each packed bed comprises packing that is wetted by liquid emitted from low pressure drop orifices in piping near the top of the packing. The piping is supported by baffles that extend into the packing so as to force back into the packing any gas that seeks to avoid the packing by flowing through any void, or inadequately wetted, zone at the top of a bed.

37 Claims, 7 Drawing Sheets

HORIZONTAL PASS, MULTIPLE PACKED-BED GAS SCRUBBER

FIELD OF THE INVENTION

This invention relates generally to gas scrubbers, and in particular to a horizontal pass, multiple packed-bed gas scrubber.

Background and Summary of the Invention

A gas scrubber may be generally defined as any device that removes solute from a gas stream by contacting the solute-containing gas with a scrubbing liquid. When the concentration of the noxious is fairly small, say 5000 parts per million (ppm) or less, a gas scrubber is sometimes referred to as a fume scrubber.

Packed fume scrubbers are widely used because their gas flow paths have a relatively low pressure drop and consequently minimize the fan power that is required to move the gas being scrubbed through the scrubber. A horizontal gas scrubber comprises a scrubbing chamber having a relatively large surface area wetted by scrubbing liquid over which the solute-containing gas flows turbulently. Scrubbing is accomplished by the liquid's absorption of a soluble compound (the solute) from the gas. The liquid itself may be either contained for subsequent processing or disposal, or it may flow only once through the scrubber and then be discharged, as in the case for absorption of ammonia into water. The scrubbing liquid is introduced into the scrubbing chamber at a flow rate which depends on the amount of solute absorbed and the solubility of the solute in the solvent liquid.

The rate at which a solute is transferred across a gas/liquid interface is a function of a driving force, a mass transfer coefficient, and the available interfacial area. The driving force for solute transfer from the gas to the liquid is the partial pressure of the solute in the gas phase. This partial pressure is the product of the concentration of solute in the gas phase (expressed as a mol fraction) and the system pressure. The driving force for solute transfer from the liquid to the gas is the vapor pressure of the dissolved solute above the liquid phase. This vapor pressure varies with dissolved solute concentration and liquid temperature for a simple solution (one in which there is no interaction between the solute and the solvent). When a chemical that reacts with the solute is added to the solvent liquid, the usual vapor pressure can be reduced or eliminated. The net driving force for solute transfer is the difference between these two opposing driving forces.

The resistance to transfer of solute is assumed to be offered by a gas film on one side of the interface and a liquid film on the other side. The resistances of these two films operate in series. Whichever film offers the greater resistance to solute transfer is considered to be the controlling film. The interfacial area varies with the type and size of packing used. Since both the resistances of these films as well as the interfacial area are affected by the gas and liquid flow rates, the reciprocal of the film resistances (mass transfer coefficients) is combined with the interfacial area term (i.e., square feet per cubic foot of packing) to give an overall mass transfer coefficient. The amount of solute transferred (i.e., lb-mols per hour) is the product of the overall mass transfer coefficient, the net driving force, and the volume of packing used.

For a specific application, the amount of solute to be absorbed can be determined from the gas flow to the scrubber and the inlet and outlet solute concentrations. Then, the concentration of solute in the effluent liquid can be calculated for any liquid rate and inlet solute concentration. Henry's Law constants are available for most solutes which permit calculation of the vapor pressure for any concentration of solute in a dilute simple solution. Overall mass transfer coefficients have been determined for most types and sizes of packings in wide commercial application using a standard system of carbon dioxide absorbed into a sodium hydroxide solution. A ratio of these standard coefficients can be used to determine the relative performance of different packings.

Overall mass transfer coefficients for liquid film controlled systems vary with the liquid rate but are only slightly affected by the gas rate. Overall mass transfer coefficients for gas film controlled systems are not only affected by the liquid rate but also vary significantly with the gas rate. Since these variations as a function of flow rates have been well documented by many researchers, an experimentally determined overall mass transfer coefficient can be corrected for both liquid and gas rates to give a standard value for a particular solute and solvent combination.

For any specified gas flow and selected liquid rate, the overall mass transfer coefficient can be calculated from the standard value for that system. Thus, reliable prediction of the packing required to obtain a specific solute removal efficiency can be made from previously developed theory using simple test data. The arrangement of the elements comprising the scrubber affects the gas and liquid contacting mechanism. The achievement of the maximum possible scrubbing efficiency for any given scrubber depends on the ingenuity of the designer.

The present invention relates to a scrubber having a number of novel features that individually and collectively have resulted in the attainment of close to perfect scrubbing efficiencies, particularly for scrubbing toxic gases like chlorine and sulfur dioxide from air. A presently preferred embodiment of a single horizontal pass, multiple packed-bed gas scrubber will be hereinafter described in detail as representative of the inventive principles. Certain novel structural features have produced more uniform gas flow across the transverse cross sectional area of the gas flow path along its entire length through the scrubber, and they include particularly unique constructions for an entrance vestibule that precedes the packed-beds, a mist eliminator and exit vestibule that succeed the packed-beds, the transitions between consecutive packed passes where the direction of flow reverses, and the shapes of the packed passes. Other novel features relate to baffles that are used in association with the packed-bed passes to promote gas flow turbulence while preventing the flow from short-circuiting, or by-passing, the packing. Still further novel features relate to the means for wetting the packed passes with scrubbing liquid, and they include low pressure drop orifices in piping that deliver the liquid at relatively low velocity with both horizontal and vertical components. As a consequence of the aforementioned features, both individually and collectively, the gas flow is scrubbed with increased uniformity over the transverse cross sectional flow area, leading to extremely high scrubbing effectiveness.

Documented testing by a certified test facility of a scrubber embodying principles of the invention in accordance with U.S. EPA Reference Method SW846 0051 (identical to U.S. EPA Reference Method 26) has revealed scrubbing efficiencies significantly exceeding Uniform Fire Code specifications. The testing comprised both a peak concentration test and a sustained release test of chlorine. The peak concentration test was conducted during a 20 minute period of chlorine release in a release room, and based on chlorine evaporation rate data, it is believed that maximum inlet concentration to the scrubber occurred during this time interval. The chlorine release rate during the peak concentration test exceeded the 78 pounds per minute rate specified in the uniform Fire Code. The sustained chlorine release test was thereafter conducted during a one hour period as the remainder of the chlorine evaporated in the release room. Chlorine emission concentration data showed chlorine levels well below the 15 parts per million (ppm) specified in the Uniform Fire Code.

Results of scrubbing a 2000 pound chlorine release in the release room at a flow rate of 3000 cubic feet per minute (cfm) showed a stack discharge average chlorine concentration of 4.98 ppm during peak release test and a concentration of 0.36 ppm during sustained release test. Results of a second testing on the following day scrubbing an 1800 pound chlorine release showed a stack discharge average chlorine concentration of 6.14 ppm during peak release test and a concentration of 0.31 ppm during sustained release test. A third successful testing was performed for a 2000 pound sulfur dioxide release. Release rates for the three testings exceeded an average of 89 pounds per minute during entire release of the liquids and initially were as great as 130 pounds per minute. Sulfur dioxide removal efficiency exceeded that previously obtained for chlorine removal.

A detailed description of the invention, in an exemplary preferred embodiment representing the best mode contemplated at this time for carrying out the invention, follows with reference to accompanying drawings. The features and attributes mentioned above, along with additional characteristics and benefits of the invention, can be perceived from the detailed description, and from the concluding claims that define the inventive principles.

DESCRIPTION OF THE PREFERRED EMBODIMENT

Figure 1:
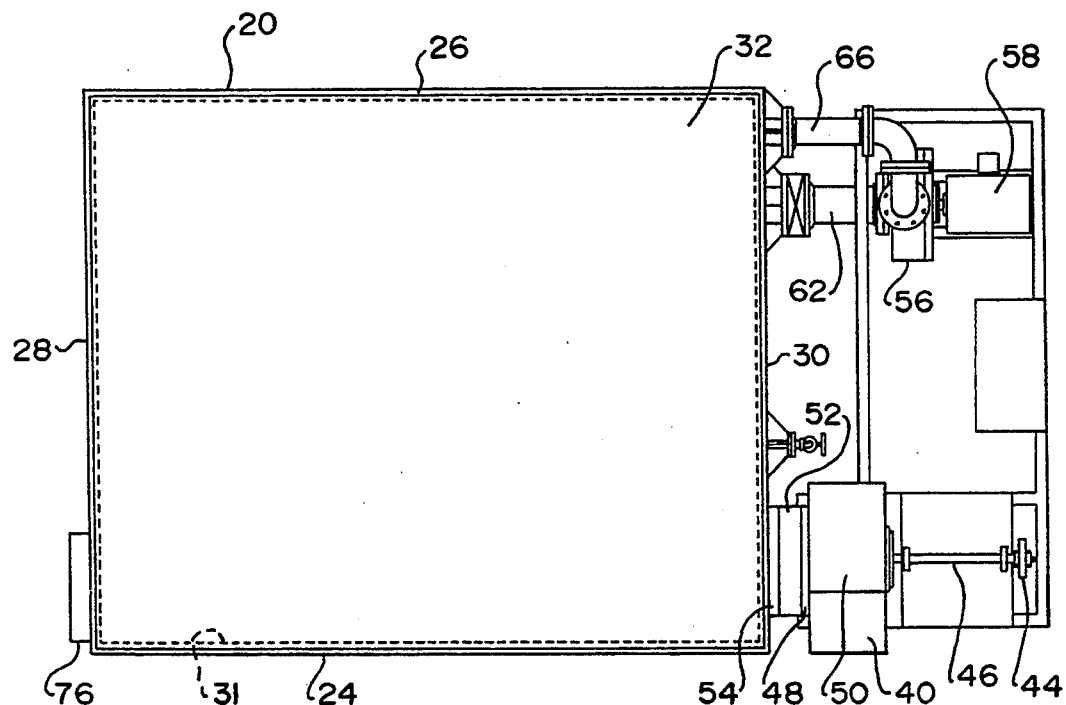
FIG. 1 is a top plan view of a scrubber installation embodying principles of the invention.
Figure 2:
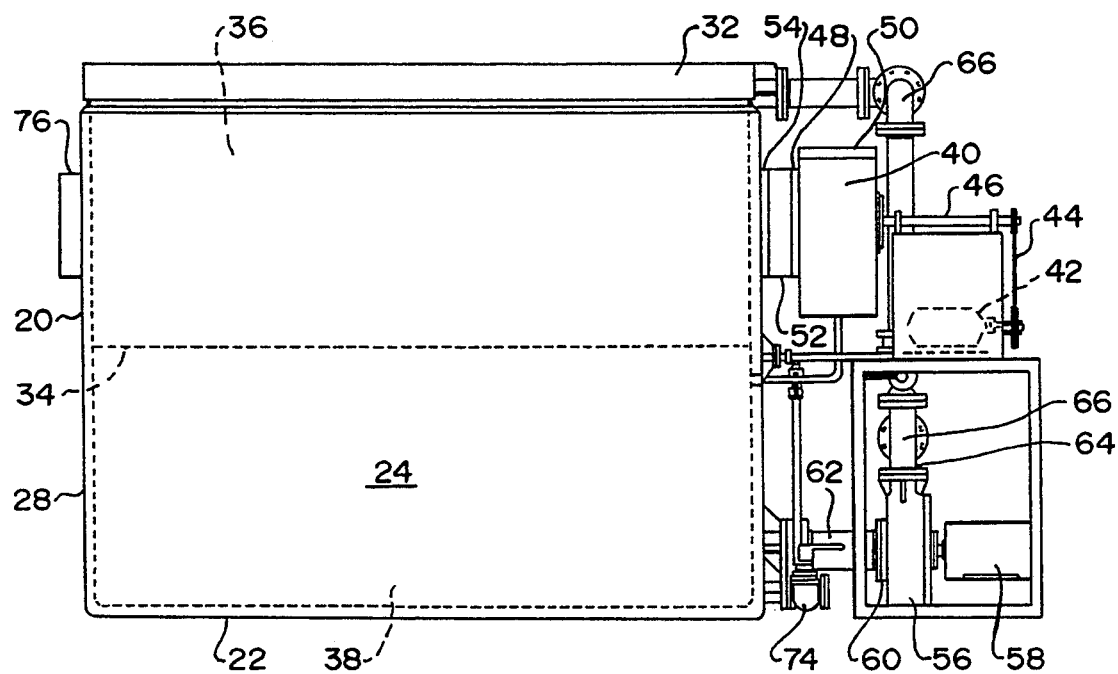
FIG. 2 is a front elevation view of FIG. 1.
Figure 3:
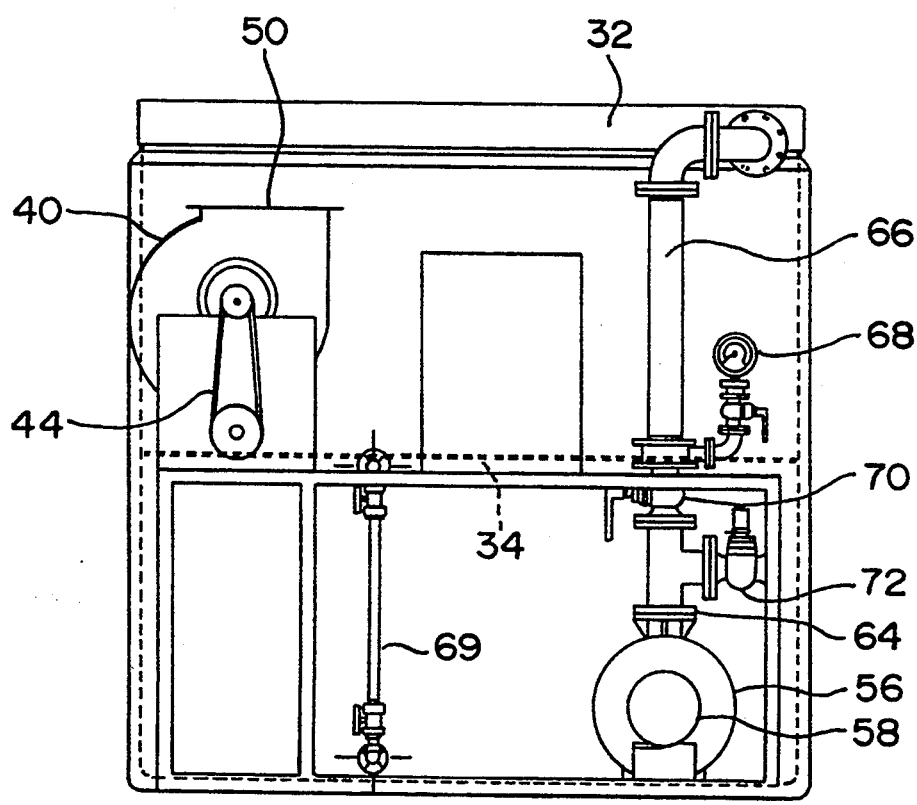
FIG. 3 is a right side elevation view of FIG. 1.
Figure 4:
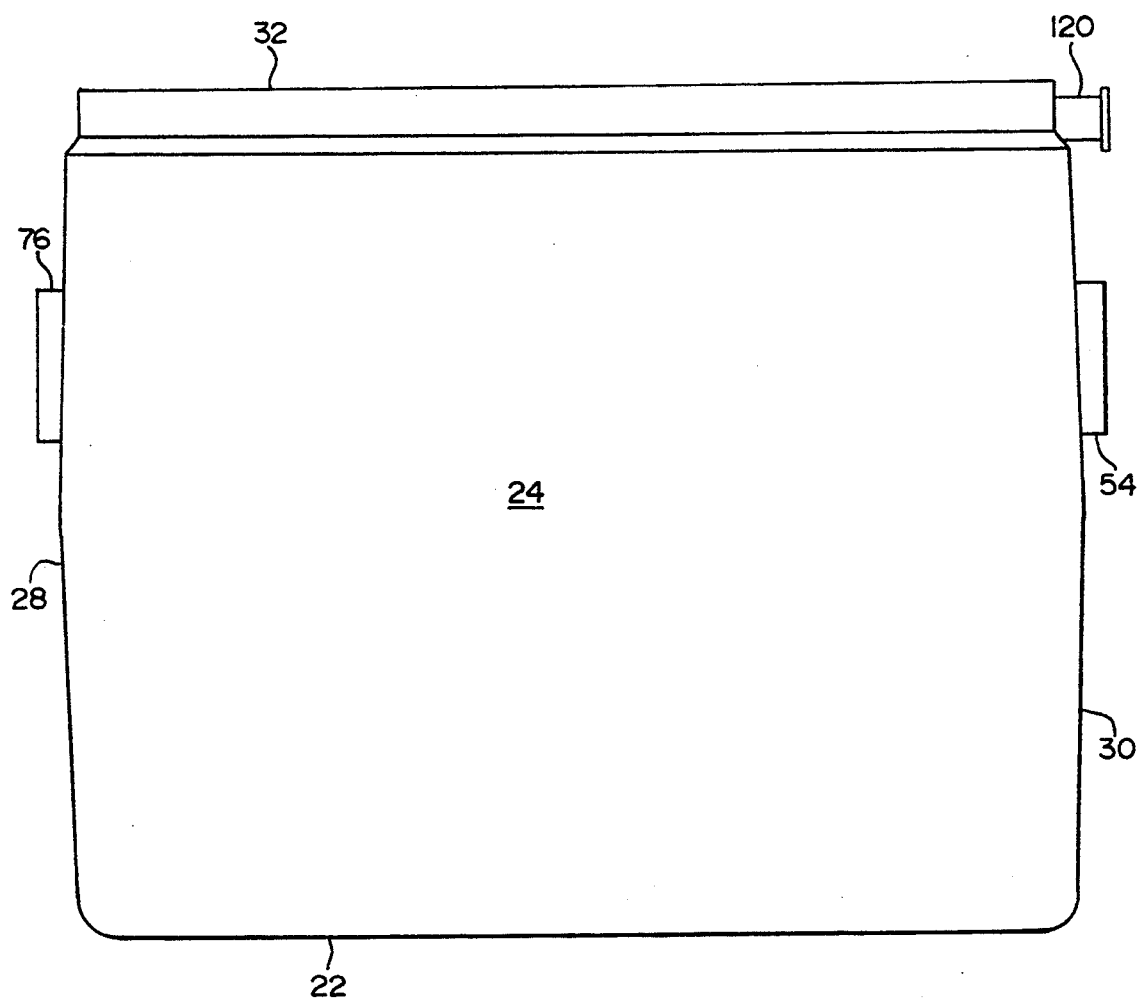
FIG. 4 is front elevation view of the scrubber enclosure by itself.
Figure 5:
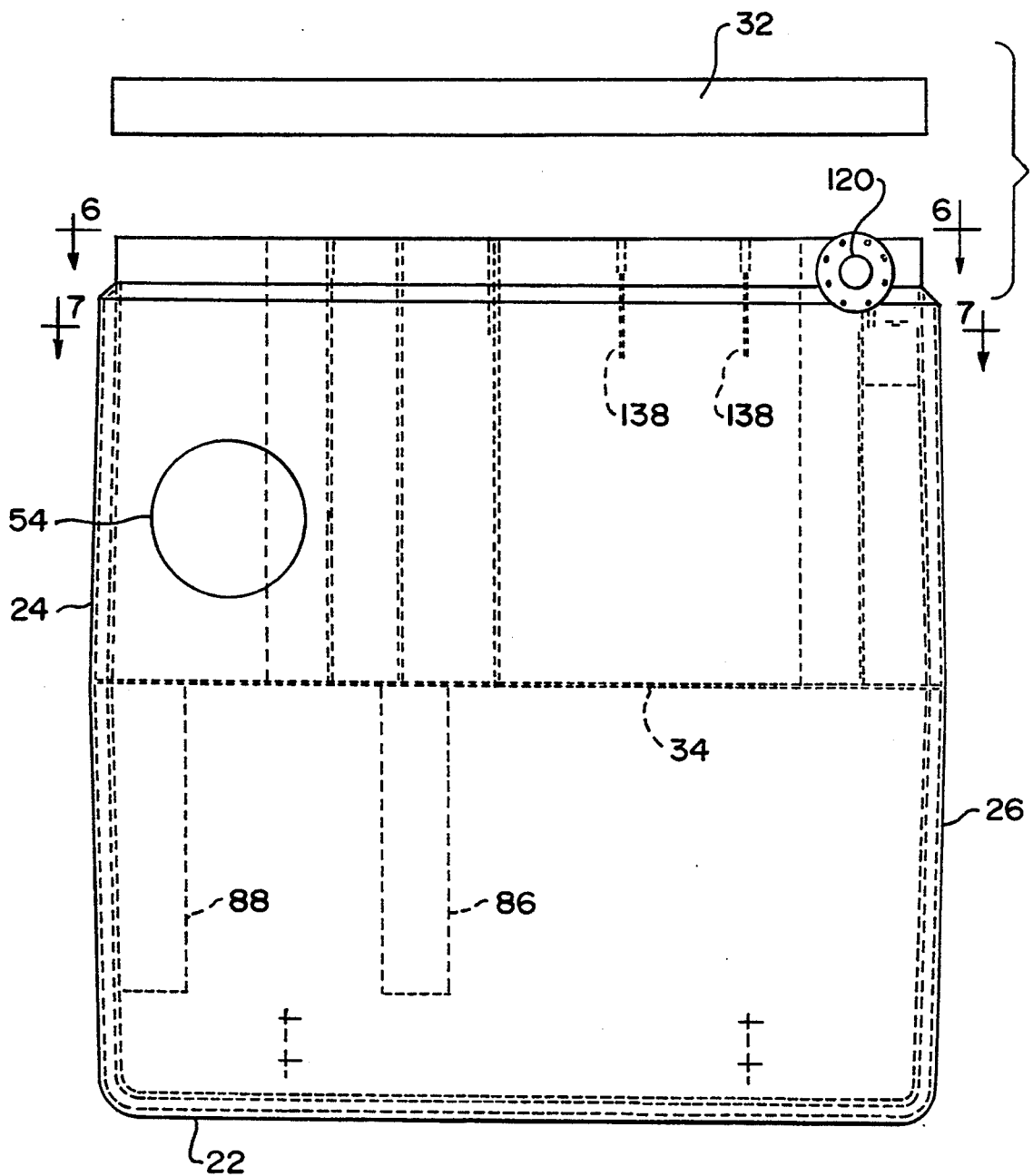
FIG. 5 is a right side elevation view of FIG. 4, showing the cover removed.
Figure 6:
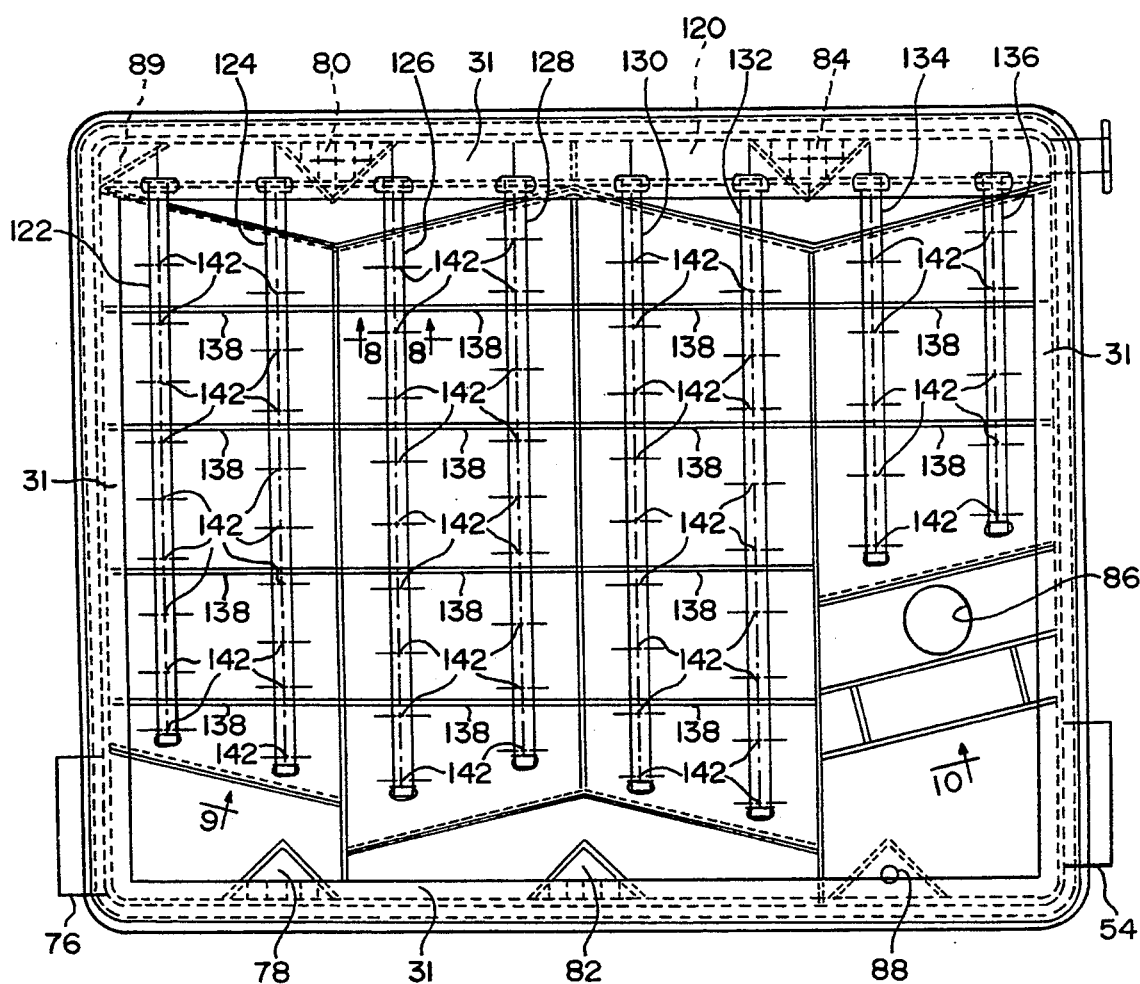
FIG. 6 is a view in the direction of arrows 6—6 in FIG. 5, rotated 90 degrees on the drawing sheet.
Figure 7:
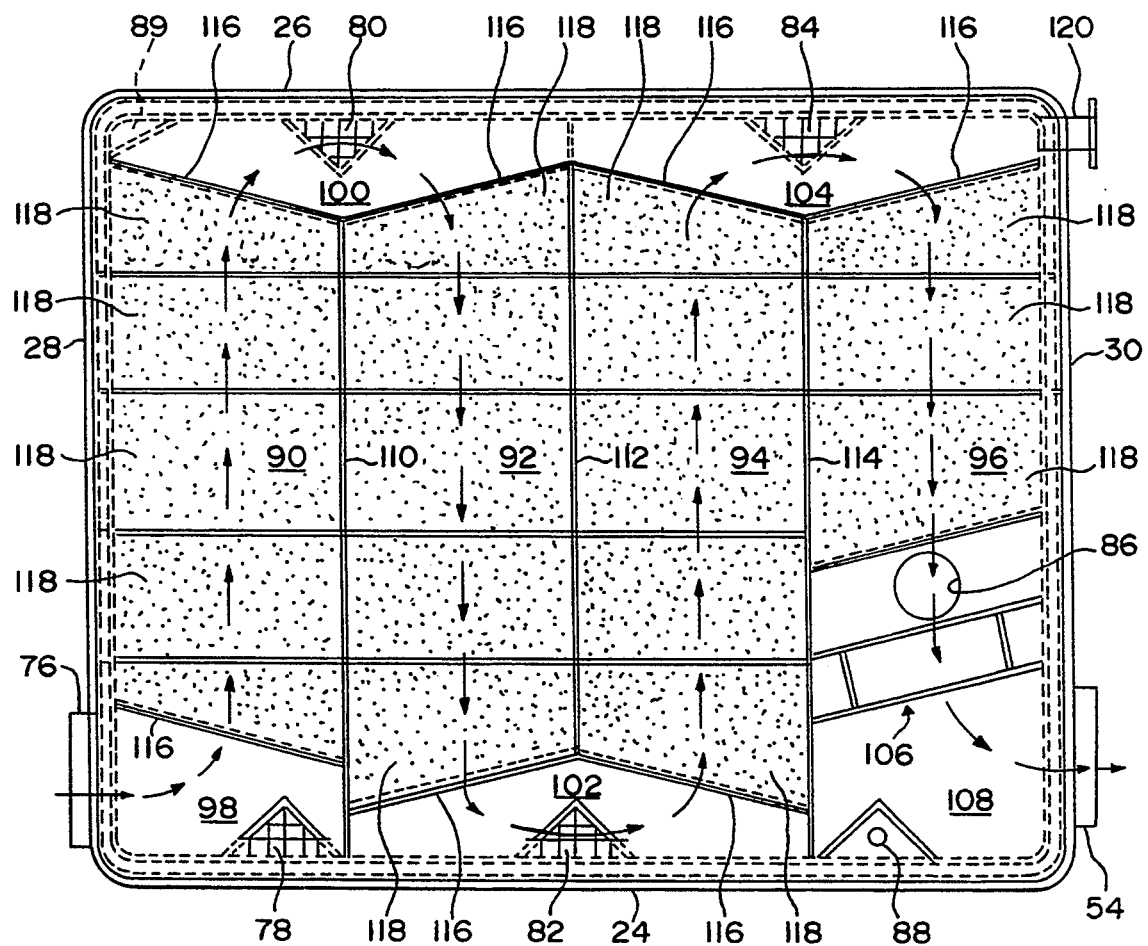
FIG. 7 is a cross section view in the direction of arrows 7—7 in FIG. 5, also rotated 90 degrees on the drawing sheet.
Figure 8:
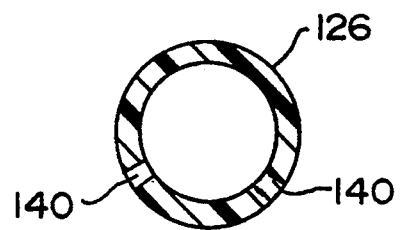
FIG. 8 is an enlarged partial vertical cross section view taken in the direction of arrows 8—8 in FIG. 6.
Figure 9:
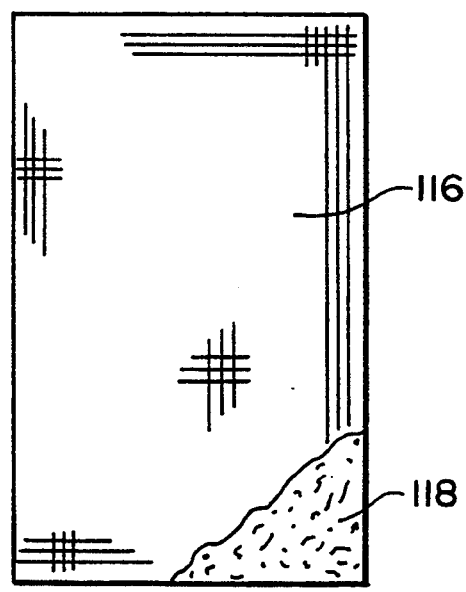
FIG. 9 is a vertical view in the direction of arrow 9 in FIG. 6.
Figure 10:
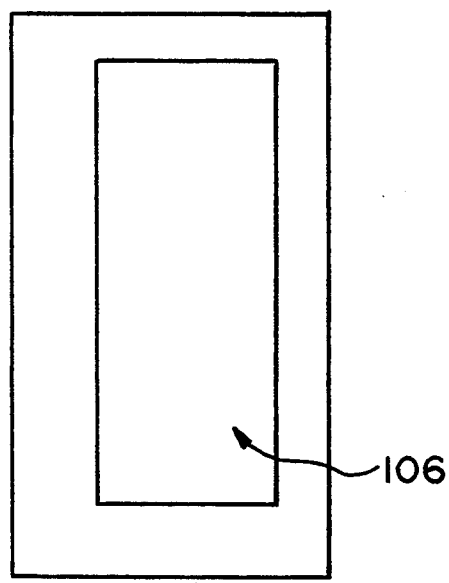
FIG. 10 is a vertical view in the direction of arrow 10 in FIG. 6.

FIGS. 1-3 show a scrubber installation embodying principles of the invention and comprising an enclosure 20 internally of which the scrubbing is performed and externally of which are located associated motor-driven gas- and liquid-handling equipment.

While the internal construction of enclosure 20 will be described in full detail in connection with later drawing Figs., it may be briefly described in connection with FIGS. 1-3 as comprising a rectangular shape having a generally horizontal bottom wall 22, generally vertical front and back side walls 24, 26, and generally vertical left and right side walls 28, 30 forming an open-top tank having an inwardly directed rim 31. A generally horizontal top wall 32 forms a cover removably closing the open-top tank formed by the five walls 22, 24, 26, 28, and 30. Internally, this tank contains a generally horizontal partition 34 that divides the tank into a rectangular-shaped scrubbing chamber 36 that directly vertically overlies a rectangularly-shaped sump 38. Scrubbing chamber 36 and sump 38 are each of suitable volume to accommodate the gas flow and the quantity of solvent respectively, and in this particular embodiment they happen to be approximately equal in volume. Partition 34 forms the floor of chamber 36 and the top, or ceiling, of sump 38. Scrubbing chamber 36 is for scrubbing a gas that is drawn as a stream through the scrubber by the associated gas-handling equipment; sump 38 is for containing a supply of scrubbing liquid that is pumped by the associated liquid-handling equipment to scrubbing chamber 36 and for collecting scrubbing liquid that drains from scrubbing chamber 36 after having scrubbed the gas.

The associated gas-handling equipment comprises a fan, or blower, 40 that is driven by an electric motor 42 via a belt and pulley drive 44 rotating a bearing-mounted driveshaft 46 that turns the blower wheel. Blower 40 comprises an inlet 48 and an outlet 50. Inlet 48 is coupled by a leak-proof coupling 52 to a gas outlet 54 of enclosure 20 that is located at about mid-height of scrubbing chamber 36 in wall 30 proximate wall 24.

The associated liquid-handling equipment comprises a pump 56 that is driven by an electric motor 58. Pump 56 has a suction port 60 that is coupled by piping 62 to communicate with enclosure 20 near the bottom of sump 38 for drawing liquid from sump 38. Pump 56 has a pressure port 64 that is coupled by piping 66 to communicate with enclosure 20 near the top of wall 30 adjacent wall 26 for introducing scrubbing liquid into scrubbing chamber 36. FIG. 3 shows a pressure gauge 68 tapped into piping 66 for enabling an observer to read header pressure, and a sight tube 69 for observing the liquid level in the sump. The Figs. also show shut-off valves 70, 72 that are selectively operable to enable liquid to be selectively pumped into or out of enclosure 20, and a shut-off valve 74 that is normally closed, but can be opened to drain the liquid from sump 38. Valves 70, 72 are normally set so that all the liquid pumped by pump 56 flows through piping 66 into scrubbing chamber 36.

Enclosure 20 further comprises a gas inlet 76 at which gas enters scrubbing chamber 36 for scrubbing. When motors 42 and 58 operate, blower 40 draws the entering gas as a stream through scrubbing chamber 36 where it is scrubbed by liquid that is being pumped from sump 38 by pump 56. The scrubbed gas is discharged at blower outlet 50. The scrubber installation having been now generally described, attention can be directed to the details of enclosure 20 that are presented by FIGS. 4–10.

The tank formed by the five walls 22, 24, 26, 28, and 30 must be of material that is impermeable and inert to the compositions involved in the scrubbing process. For scrubbing chlorine or sulfur dioxide from air, a suitable construction for the tank is double-wall material (vinyl ester fiberglass is an example of suitable material) that is sufficiently strong to contain a fill of scrubbing liquid occupying a substantial fraction of the volume of sump 38 and to support the construction and contents of the overlying scrubbing chamber 36.

Both partition 34 and cover 32 must too be impermeable and inert, and they can meet these requirements by the same material construction as the tank. Cover 32 has suitable sealing and fastening means (not shown) for engaging rim 31 to assure that it seals off the interior of scrubbing chamber 36 in leakproof manner when it is in place on the tank. Partition 34 is imperforate except at several locations where it is perforate for communication with vertically depending drain conduits. In the exemplary embodiment shown in the Figs., there are six such drain conduits 78, 80, 82, 84, 86, and 88. These drain conduits extend into sump 38 to levels that will assure that their lower ends are always immersed in liquid. Enclosure 20 is also provided with an internal vertical vent pipe 89 in one corner for venting the headspace of sump 38 to scrubbing chamber 36.

Scrubbing chamber 36 comprises four horizontal packed-beds generally designated 90, 92, 94, and 96, in order, from gas inlet 76 to gas outlet 54. These beds are arranged horizontally side-by-side and with their lengths parallel to one another, extending in the direction between front side wall 24 and back side wall 26. The beds are of substantially equal widths, each being substantially one-fourth the distance between left side wall 28 and right side wall 30. The heights of the beds are also substantially equal, being the distance from cover 32 to partition 34, but there may be some minor height variation along the length of each due to some slight slopes in partition 34 toward the various drain conduits. The gas flow path through scrubbing chamber 36 is indicated by the unnumbered arrows.

At the location where gas enters enclosure 20 from gas inlet 76, there is an entrance vestibule 98 that is free of packing, and contains the entrance to drain conduit 78. Gas entering the enclosure first makes a ninety degree turn as it passes through vestibule 98 and then continues on straight through the length of the first packed-bed 90. After having passed through the first packed-bed 90, gas enters a transition 100 that forms a 180 degree turn-around for completely reversing the gas stream as the flow passes to the second packed-bed 92. Transition 100 is free of packing, and contains the entrance to drain conduit 80. Gas flows through the second packed-bed in the opposite direction from the first, and after having passed through the second packed-bed, the gas enters another transition 102 that forms a 180 degree turn-around for reversing the gas stream as the flow passes to the third packed-bed 94. Transition 102 is free of packing, and contains the entrance to drain conduit 82. Gas flows through the third packed-bed 94 in the opposite direction from the second 92, and after having passed through the third packed-bed, the gas enters another transition 104 that forms a 180 degree turn-around for reversing the gas stream as the flow passes to the fourth packed-bed 96. Transition 104 is free of packing, and contains the entrance to drain conduit 84.

The two middle packed-beds 92, 94 are of substantially equal length, but the first 90 is slightly shorter to provide for vestibule 98, and the fourth 96 is somewhat shorter yet to provide for a mist eliminator 106 and an exit vestibule 108 just before the gas passes through gas outlet 54 to exit enclosure 20. The section encompassing mist eliminator 106 contains the entrance to drain conduit 86 while exit vestibule 108 contains the entrance to drain conduit 88.

The two packed-beds of each side-by-side pair are separated by a corresponding vertical partition that extends from horizontal partition 34 to cover 32 and is of suitable material like that used in the tank. In the illustrated four packed-bed scrubber there are three such vertical partitions 110, 112, 114. Partition 110, which divides packed-bed 90 from packed-bed 92, extends away from wall 24, also separating vestibule 98 from transition 102, but it stops short of the opposite wall 26, ending at transition 100. Partition 112, which divides packed-bed 92 from packed-bed 94, extends away from wall 26, also separating transition 100 from transition 104, but it stops short of wall 24, ending at transition 102. Partition 114, which divides packed-bed 94 and transition 102 from packed-bed 96, mist eliminator 106, and vestibule 108, extends from wall 24, but stops short of wall 26, ending at transition 104.

In plan view, each packed-bed has the shape of a parallelogram whose lengthwise ends are at other than a right angle to the length. The one lengthwise end of each packed-bed 90, 92, 94 at which the gas stream exits the packed-bed is the beginning of the next transition 100, 102, 104, and the other lengthwise end of each packed-bed 92, 94, 96 at which the gas stream enters the packed-bed is the end of the preceding transition 100, 102, 104. These lengthwise ends of the packed-beds, and hence the beginning and end of each transition, occupy vertical planes. The angulation of the lengthwise ends of the packed-beds at the transitions where the gas stream is required to make a complete reversal in direction promotes the attainment of more uniform gas flow across the entire transverse cross sectional area of a packed-bed throughout its length. The attainment of greater flow uniformity correspondingly serves to maintain a more substantially constant gas to liquid ratio within the packing and is definitely advantageous for maximizing the scrubbing efficiency of a packed-bed. In the illustrated embodiment, the ending of one packed-bed and the beginning of the immediately succeeding one at each transition 100, 102, 104 form an obtuse angle. It is entirely possible that an optimum specific angle in any given scrubber embodying the inventive principles may be the same as or different from this particular angle.

As mentioned above, the flow entering vestibule 98 through gas inlet 76 is required to make a ninety degree turn in order to enter packed-bed 90. The beginning end of packed-bed 90 also occupies a vertical plane at other than a right angle to the length of the packed-bed. As viewed in plan at vestibule 98, the cooperative narrowing taper effect of tank wall 24 and the beginning end of packed-bed 90 encourages gas flow uniformity over the transverse cross sectional area through the packing. A similar effect exists at mist eliminator 106 and exit vestibule 108 where the exit end of packed-bed 96 lies is a vertical plane that is angled to the bed's length at the entrance to the mist eliminator, and the mist eliminator is itself disposed vertically parallel with the exit end of the packed-bed, but non-parallel with wall 24 to provide exit vestibule 108 with an expanding taper in the direction of gas outlet 54, as viewed in plan.

In order to contain the actual packing material at the beginning and end of each packed-bed, there is a vertical rectangular grating 116 covering each lengthwise end and suitably secured to the surrounding structure. The height available for gas flow through a grating is at least equal to the width of the gas flow passage through a bed in this particular example, but other examples may have a different relationship. Each grating has as large an open area as possible consistent with the strength and rigidity required of it. Conventional fiberglass grating having a 71% open area is typically suitable. The actual packing material 118 for the beds can be any conventional, commercially available packing used in scrubbers; for example, Intalox Snowflake. A plastic packing material is preferable because of its light weight and its resistance to corrosion. This packing provides a high void fraction in the bed to minimize gas stream pressure drop and has a large accessible surface area to promote rapid mass transfer of solute. At each transition 100, 102, 104 in the disclosed scrubber then, one grating 116 is essentially coincident with the end of the immediately preceding packed-bed and the other grating 116 is essentially coincident with the beginning of the immediately succeeding packed-bed. They occupy respective, essentially flat, vertical planes that are transverse, but not at a right angle, to the length of the respective packed-bed. Stated somewhat more generically, they occupy other than a flat vertical plane that is perpendicular to the length of the respective packed-bed.

Having described details of the scrubber relating to the gas flow path, it is now appropriate to turn to details of the scrubber's liquid system.

Internally of enclosure 20 at the top of scrubbing chamber 36 is liquid distribution piping comprising a horizontal header 120 extending along wall 26 for essentially the entire distance between walls 28 and 30. Header 120 receives liquid from piping 66 and distributes it to a number of parallel branch pipes that tee into the header at right angles at one end and that are capped at the other end. In the illustrated embodiment of scrubber, there are eight such pipes 122, 124, 126, 128, 130, 132, 134, 136, two per pass, as illustrated. The branch pipes are supported on enclosure 20 by means of vertical baffles, or baffle plates, 138 that are of the same material as the partitions and tank and are disposed between the lateral boundaries of the packed-beds, namely wall 28 and partition 110 in the case of packed-bed 90, partition 110 and partition 112 in the case of packed-bed 92, partition 112 and partition 114 in the case of packed-bed 94, and partition 114 and wall 30 in the case of packed-bed 96.

So that their presence does not unduly impose restrictions on the gas flow, baffles 138 extend vertically from cover 32 only a distance that is small in comparison to the height of the packed-beds; yet, the baffles are important in performing a second function that is additional to the function of supporting the branch pipes. The second function is that of reducing any tendency of the gas stream to by-pass, or short-circuit, the packing by intruding through voids (albeit that their vertical dimensions may be small) between the top of the packing and the inside surface of cover 32. Due to the tendency for a bed of random packing to settle in operation leaving a void space immediately beneath cover 32, a portion of the gas stream seeking a path of least resistance through the packed-bed may, in the absence of a series of several baffles spaced apart along the length of the packed-bed as shown, seek to follow a path through such voids. Because these voids lack the density of scrubbing liquid that is present in the wetted packing material below them, the gas flowing through them is relatively poorly scrubbed. Although the percentage of flow through such voids may be small in comparison to the total flow, the fact that it might be poorly scrubbed would significantly detract from overall scrubbing efficiency. Baffles 138 prevent this loss of scrubbing efficiency by thwarting attempted flow through such voids by driving the gas stream back into the packing where it can be efficiently scrubbed.

The two branch pipes for each packed-bed are parallel to the packed-bed's length, and each lies midway between an imaginary vertical plane bisecting the bed and the corresponding adjacent lateral boundary of the bed. Each branch pipe comprises a pattern of low pressure drop distribution orifices 140 through which liquid is emitted to wet the packing material 118. The locations of these orifices are designated in FIG. 6 by the small crosses marked by the reference numerals 142. Orifices 140 are simply through-holes in the walls of the branch pipes arranged to discharge liquid streams; they contain no nozzles. At all locations 142, there are typically two downwardly and outwardly facing orifices 140, located symmetrically about an imaginary vertical plane passing lengthwise through the axis of the branch pipe, as portrayed in FIG. 8. Streams of liquid are emitted from these two orifices with both vertical and horizontal components. The particular size, particular number, particular spacing distances, and particular locations of the orifices in each pipe are chosen to deliver a uniform pattern of irrigation that produces fast and thorough wetting throughout each packed-bed. The pipes are sized appropriately to deliver the requisite orifice flows with minimal pipe losses. In the disclosed embodiment for example, the design objective is to size the piping and orifices such that equal liquid flow is delivered through each orifice with a minimal pressure drop. Although circular orifices are easy to create, circularity is not necessarily an essential attribute of any particular orifice. The packing material 118 exhibits an inherent tendency to spread out the scrubbing liquid, thereby maximizing the interfacial area available for mass transfer of solute to the liquid. Even though orifices 140 are aimed downwardly and outwardly, the fact that the branch pipes are fully circumferentially surrounded by packing material causes liquid to be dispersed in all directions as it strikes the packing upon leaving the orifices, including wetting packing material both above and below the pipes and along the length of the packed-beds. Although the extent to which the packing that lies at and above the elevation of the branch pipes is wetted may be somewhat problematic, passage of the gas stream through any potentially inadequately wetted packing near the top of the bed can be avoided by extending baffles 138 downwardly a sufficient distance below the elevation of the branch pipes so as to prevent any gas from bypassing through such an inadequately wetted zone of the packing. The emitted liquid flows as a film over the packing surfaces, eventually migrating under the influence of gravity through the beds, but the packing is being continually wetted by freshly emitted liquid to continually replenish the film.

When it reaches the bottom of the beds, the liquid flows along partition 34 to the entrances of the various drain conduits and drains back to sump 38, carrying solute with it.

The extremely efficient scrubbing of substantial gas volumes, as documented by the testings mentioned above, is believed due to the creation of both an expansive liquid-gas interfacial area and this generally uniform gas flow throughout the transverse cross sectional area of each pack-bed along its entire length. Moreover, the scrubbing is accomplished at low horsepower requirements for the electric motors that provide the power for moving both gas and liquid. The provision of the mist eliminator has been found useful in final removal of air-entrained liquid before leaving the scrubber.

The gas flow path through the scrubber lies in a generally horizontal plane. The liquid flow paths through the scrubber lie in generally vertical planes. Thus, the gas flow path is generally perpendicular to the liquid flow path in each packed-bed. The packed beds have no particular directional orientation. The gas flow area is defined by the width and height of the packed-bed while the liquid flow area is defined by the width and length of the packed-bed.

More detailed information about particular physical characteristics of the illustrated four packed-bed embodiment will now be given as a specific example of scrubber embodying the inventive principles. The fact that these particular characteristics are being given should not in any way be construed as imposing any specific limitations on the scope of the invention since the scope of the invention is defined by the claims at the conclusion of this patent specification.

Outside dimensions of enclosure 20: 126"×102"×102"

Liquid capacity of sump 38: 600 gallons per vertical foot

Gas flow rate: 3000 cfm @6" water static pressure loss

Liquid flow rate: 400 gallons per minute @3 PSIG

One of the outstanding attributes of the invention is that scrubbers for different applications may be designed with predictability of their performance. This is an important competitive advantage for a manufacturer who is required to bid to different job specifications for different users.

Naturally, good engineering design practices are mandatory in designing any particular scrubber, and it is expected that those skilled in the art will be enabled to practice the invention disclosed herein without the necessity of including any more detail than that already presented. While some aspects of the invention are specific to a four-bed configuration as illustrated herein, it should be understood that the invention possesses certain generic aspects, not necessarily limited to a four-bed configuration. Moreover, the fact that the above-described scrubber has been disclosed as possessing certain features is not to be construed as necessarily limiting the invention's scope, and reference is made for example to the fact that the specific scrubber that is illustrated has a sump below the scrubber, the fact that header 120 is internal to scrubbing chamber 36, and the fact that the pump and blower are located exteriorly adjacent the enclosure. It is contemplated that certain inventive principles may be practiced in other embodiments where the header is external to the scrubbing chamber, where the pump, blower, and/or sump are remotely located, or where the pump is in the sump. The sump can be of any shape that contains the needed volume of liquid. Likewise, some other embodiments could even omit a sump and/or a recirculating pump, such as in a once-through scrubber where the liquid is fed to the header, passes through the packings and drains to a sewer. The locations of the gas inlet and outlet may be in locations different from those specifically illustrated; in another embodiment for example, the gas inlet and gas outlet are located in front wall 24 in line with the gas flow through the first packed-bed and the fourth packed-bed respectively, and actually all four beds could be of the same length if the mist eliminator were located external to scrubbing chamber 36. It should also be recognized that it is not essential to have the individual packed-beds of the same width and height, although having them the same generally simplifies construction of the scrubber; the gas volume is progressively reduced as the solute is absorbed from the gas stream. The specific type of blower, pump, and drive is generally not critical so long as they are selected in accordance with good engineering practices for this application. Although they may not appear in detail in the drawing Figs., suitable sealing gaskets are disposed between cover 32 and the top edges of immediately underlying structural elements so that leakage does not occur. Such gaskets seal the perimeter of the cover to the perimeter of the open top of enclosure 20, the top edges of baffles 138 to the inside of the cover, and the top edges of partitions 110, 112, 114 to the inside of the cover.

One of the more significant attributes of the invention deserves more discussion, and that is the low power requirements for the scrubber. The blower in the disclosed example requires less than 1.2 hydraulic horsepower per 1000 cubic feet of gas being scrubbed; the pump, less than 0.30 hydraulic horsepower per 100 gallons per minute of liquid being recirculated. The ability to use less powerful, and hence less expensive, components is directly attributable to the construction of the scrubber.

The four-packed bed example disclosed above possesses a ratio of total packed length to mean gas flow path length of approximately 0.89, and it is believed that a fairly large ratio is important in attaining the predictability of design mentioned above. Too low a ratio will result in unpredictability. Calculations have indicated that a scrubber embodying inventive principles will have a ratio no less than 0.77.

While a presently preferred embodiment of the invention has been illustrated and described, it is to be understood that principles of the invention that are defined by the following claims may be incorporated into various other embodiments.

What is claimed as the invention is:

1. A horizontal pass multiple packed-bed gas scrubber for removing solute from a gas stream comprising:
    an enclosure comprising wall means forming a scrubbing chamber;
    a sump for holding a supply of scrubbing liquid;
    pump means for pumping scrubbing liquid from said sump to said scrubbing chamber;
    drain means for draining scrubbing liquid from said scrubbing chamber to said sump;
    said scrubbing chamber comprising means defining a gas flow path which extends between a gas inlet where solute-containing gas enters said enclosure and a gas outlet where scrubbed gas exits said enclosure and to which the gas stream is constrained as it passes through said enclosure;

fan means for causing gas to enter said enclosure through said gas inlet, and the gas stream to move through said gas flow path and exit said enclosure through said gas outlet, said gas flow path comprising multiple, successively side-by-side, horizontal packed-beds, each containing packing material occupying the bed's length and filling the bed's transverse cross sectional area, and a transition that is unoccupied by packing material for conveying the gas stream horizontally from an immediately preceding bed to an immediately succeeding bed and reversing the direction such that the gas stream travels through said immediately succeeding bed in the opposite direction from the direction through said immediately preceding bed;

said packing material serving, when wetted by scrubbing liquid, to spread out the scrubbing liquid into an expansive interfacial area;

said scrubbing chamber further comprising distribution means for distributing scrubbing liquid pumped from said pump means throughout the packing material in said beds for thoroughly wetting the same to create throughout the packing material an expansive interfacial area for the scrubbing liquid to interface with the gas stream and accomplish efficient mass transfer removal of solute from the gas stream as it passes through said beds and thereafter conveying solute-containing scrubbing liquid to said drain means for draining the same to said sump; and wherein said transition presents to the gas stream entering it an entrance area that is defined by a lengthwise end of said immediately preceding bed and to the gas stream exiting it an exit area that is defined by a lengthwise beginning of said immediately succeeding bed, and wherein said end of said immediately preceding bed and said beginning of said immediately succeeding bed occupy respective vertical planes that make an obtuse angle with each other.

2. A horizontal pass multiple packed-bed gas scrubber as set forth in claim 1 wherein said immediately preceding bed and said immediately succeeding bed share a common vertical partition that laterally separates them from each other.

3. A horizontal pass multiple packed-bed gas scrubber as set forth in claim 1 wherein said enclosure comprises further wall means forming said sump directly vertically beneath said scrubbing chamber.

4. A horizontal pass multiple packed-bed gas scrubber for removing solute from a gas stream comprising:

an enclosure comprising wall means forming a scrubbing chamber;

a sump for holding a supply of scrubbing liquid;

pump means for pumping scrubbing liquid from said sump to said scrubbing chamber;

drain means for draining scrubbing liquid from said scrubbing chamber to said sump;

said scrubbing chamber comprising means defining a gas flow path which extends between a gas inlet where solute-containing gas enters said enclosure and a gas outlet where scrubbed gas exits said enclosure and to which the gas stream is constrained as it passes through said enclosure;

fan means for causing gas to enter said enclosure through said gas inlet, and the gas stream to move through said gas flow path and exit said enclosure through said gas outlet, said gas flow path comprising multiple, successively side-by-side, horizontal packed-beds, each containing packing material occupying the bed's length and filling the bed's transverse cross sectional area, and a transition that is unoccupied by packing material for conveying the gas stream from an immediately preceding bed to an immediately succeeding bed and reversing the direction such that the gas stream travels through said immediately succeeding bed in the opposite direction from the direction through said immediately preceding bed;

said packing material serving, when wetted by scrubbing liquid, to spread out the scrubbing liquid into an expansive interfacial area;

said scrubbing chamber further comprising distribution means for distributing scrubbing liquid pumped from said pump means throughout the packing material in said beds for thoroughly wetting the same to create throughout the packing material an expansive interfacial area for the scrubbing liquid to interface with the gas stream and accomplish efficient mass transfer removal of solute from the gas stream as it passes through said beds and thereafter conveying solute-containing scrubbing liquid to said drain means for draining the same to said sump; and wherein said transition presents to the gas stream entering it an entrance area that is defined by a lengthwise end of said immediately preceding bed and to the gas stream exiting it an exit area that is defined by a beginning of said immediately succeeding bed, and wherein said end of said immediately preceding bed occupies other than a flat vertical plane that is perpendicular to the length of said immediately preceding bed, and said beginning of said immediately succeeding bed occupies other than a flat vertical plane that is perpendicular to the length of said immediately succeeding bed.

5. A horizontal pass multiple packed-bed gas scrubber as set forth in claim 4 wherein said transition is constructed and arranged to convey the gas stream horizontally from said immediately preceding bed to said immediately succeeding bed.

6. A horizontal pass multiple packed-bed gas scrubber as set forth in claim 5 wherein said immediately preceding bed and said immediately succeeding bed are parallel and share a common vertical partition that laterally separates them from each other.

7. A horizontal pass multiple packed-bed gas scrubber as set forth in claim 4 wherein said enclosure comprises further wall means forming said sump directly vertically beneath said scrubbing chamber.

8. A horizontal pass multiple packed-bed gas scrubber for removing solute from a gas stream comprising:

an enclosure comprising wall means forming a scrubbing chamber;

a sump for holding a supply of scrubbing liquid;

pump means for pumping scrubbing liquid from said sump to said scrubbing chamber;

drain means for draining scrubbing liquid from said scrubbing chamber to said sump;

said scrubbing chamber comprising means defining a gas flow path which extends between a gas inlet where solute-containing gas enters said enclosure and a gas outlet where scrubbed gas exits said enclosure and to which the gas stream is constrained as it passes through said enclosure;

fan means for causing gas to enter said enclosure through said gas inlet, and the gas stream to move through said gas flow path and exit said enclosure through said gas outlet, said gas flow path comprising multiple, successively side-by-side, horizontal packed-beds each containing packing material occupying the bed's length and filling the bed's transverse cross sectional area, and a transition that is unoccupied by packing material for conveying the gas stream horizontally from an immediately preceding bed to an immediately succeeding bed and reversing the direction such that the gas flow travels through said immediately succeeding bed in the opposite direction from the direction through said immediately preceding bed;

said packing material serving, when wetted by scrubbing liquid, to spread out the scrubbing liquid into an expansive interfacial area;

said scrubbing chamber further comprising distribution means for distributing scrubbing liquid pumped from said pump means throughout the packing material in said beds for thoroughly wetting the same to create throughout the packing material an expansive interfacial area for the scrubbing liquid to interface with the gas stream and accomplish efficient mass transfer removal of solute from the gas stream as it passes through said beds and thereafter conveying solute-containing scrubbing liquid to said drain means for draining the same to said sump; and wherein said immediately preceding and said immediately-succeeding beds each comprises a beginning and an end, said beginning and said end of said immediately preceding bed occupy respective vertical planes that are parallel with each other but other than perpendicular to the length of said immediately preceding bed, and said beginning and said end of said succeeding bed occupy respective vertical planes that are parallel with each other but other than perpendicular to the length of said succeeding bed.

9. A horizontal pass multiple packed-bed gas scrubber as set forth in claim 8 wherein said immediately preceding and said succeeding beds are parallel with each other.

10. A horizontal pass multiple packed-bed gas scrubber as set forth in claim 9 wherein said immediately preceding and said succeeding beds share a common vertical partition that laterally separates them from each other.

11. A horizontal pass multiple packed-bed gas scrubber as set forth in claim 7 wherein said enclosure comprises further wall means forming said sump directly vertically beneath said scrubbing chamber.

12. A horizontal pass multiple packed-bed gas scrubber for removing solute from a gas stream comprising:
an enclosure comprising wall means forming a scrubbing chamber;
a sump for holding a supply of scrubbing liquid;
pump means for pumping scrubbing liquid from said sump to said scrubbing chamber;
drain means for draining scrubbing liquid from said scrubbing chamber to said sump;

said scrubbing chamber comprising means defining a gas flow path which extends between a gas inlet where solute-containing gas enters said enclosure and a gas outlet where scrubbed gas exits said enclosure and to which the gas stream is constrained as it passes through said enclosure;

fan means for causing gas to enter said enclosure through said gas inlet, and the gas stream to move through said gas flow path and exit said enclosure through said gas outlet, said gas flow path comprising multiple, successively side-by-side, horizontal packed-beds each containing packing material occupying the bed's length and filling the bed's transverse cross sectional area, and a transition that is unoccupied by packing material for conveying the gas stream from an immediately preceding bed to an immediately succeeding bed and reversing the direction such that the gas flow travels through said immediately succeeding bed in the opposite direction from the direction through said immediately preceding bed;

said packing material serving, when wetted by scrubbing liquid, to spread out the scrubbing liquid into an expansive interfacial area;

said scrubbing chamber further comprising distribution means for distributing scrubbing liquid pumped from said pump means throughout the packing material in said beds for thoroughly wetting the same to create throughout the packing material an expansive interfacial area for the scrubbing liquid to interface with the gas stream and accomplish efficient mass transfer removal of solute from the gas stream as it passes through said beds and thereafter conveying solute-containing scrubbing liquid to said drain means for draining the same to said sump; and wherein said transition presents to the gas stream entering it an entrance area that is defined by a lengthwise end of said immediately preceding bed and to the gas stream exiting it an exit area that is defined by a beginning of said immediately succeeding bed, and wherein said end of said immediately preceding bed occupies other than a flat vertical plane that is perpendicular to the length of said immediately preceding bed, and said beginning of said immediately succeeding bed occupies other than a flat vertical plane that is perpendicular to the length of said immediately succeeding bed.

13. A horizontal pass multiple packed-bed gas scrubber as set forth in claim 12 wherein said immediately preceding and said succeeding beds are parallel with each other.

14. A horizontal pass multiple packed-bed gas scrubber as set forth in claim 13 wherein said immediately preceding and said succeeding beds share a common vertical partition that laterally separates them from each other.

15. A horizontal pass multiple packed-bed gas scrubber as set forth in claim 12 wherein said enclosure comprises further wall means forming said sump directly vertically beneath said scrubbing chamber.

16. A horizontal pass multiple packed-bed gas scrubber for removing solute from a gas stream comprising:
an enclosure comprising wall means forming a scrubbing chamber, including a horizontal top wall of said scrubbing chamber;
a sump for holding a supply of scrubbing liquid at an elevation below that of said scrubbing chamber;

pump means for pumping scrubbing liquid from said sump to said scrubbing chamber;

drain means for draining scrubbing liquid from said scrubbing chamber to said sump;

said scrubbing chamber comprising means defining a gas flow path which extends between a gas inlet where solute-containing gas enters said enclosure and a gas outlet where scrubbed gas exits said enclosure and to which the gas stream is constrained as it passes through said enclosure;

fan means for causing gas to enter said enclosure through said gas inlet, and the gas stream to move through said gas flow path and exit said enclosure through said gas outlet, said gas flow path comprising multiple, successively side-by-side, horizontal packed-beds each containing packing material occupying the bed's length and filling the bed's transverse cross sectional area, and a transition for conveying the gas stream horizontally from an immediately preceding bed to an immediately succeeding bed and reversing the direction such that the gas flow travels through said immediately succeeding bed in the opposite direction from the direction through said immediately preceding bed;

said packing material serving, when wetted by scrubbing liquid, to spread out the scrubbing liquid into an expansive interfacial area;

said scrubbing chamber further comprising distribution means for distributing scrubbing liquid pumped from said pump means throughout the packing material in said beds for thoroughly wetting the same to create throughout the packing material an expansive interfacial area for the scrubbing liquid to interface with the gas stream and accomplish efficient mass transfer removal of solute from the gas stream as it passes through said beds and thereafter conveying solute-containing scrubbing liquid to said drain means for draining the same to said sump; and wherein said distribution means comprises piping that is disposed proximate the tops of said beds and that is supported by baffles which are spaced apart along the length of each of said beds, which transversely span each of said beds, and which extend vertically from a location proximate said top wall of said scrubbing chamber into the packing material in each of said beds, and wherein said piping comprises low pressure drop orifices through which scrubbing liquid is emitted from the piping into the packing material.

17. A horizontal pass multiple packed-bed gas scrubber as set forth in claim 16 wherein said piping comprises tubular pipe, and said low pressure drop orifices are through-holes in the wall of said tubular pipe.

18. A horizontal pass multiple packed-bed gas scrubber as set forth in claim 17 wherein said orifices are disposed at several locations spaced along the length of each of said beds, and at each location there are two orifices that are aimed laterally outwardly in opposite directions to either side of vertical so as to emit scrubbing liquid with both horizontally outward and vertically downward components.

19. A horizontal pass multiple packed-bed gas scrubber as set forth in claim 16 wherein said enclosure comprises further wall means forming said sump directly vertically beneath said scrubbing chamber.

20. A horizontal pass multiple packed-bed gas scrubber as set forth in claim 16 wherein said transition is unoccupied by packing material.

21. A horizontal pass multiple packed-bed gas scrubber as set forth in claim 20 wherein said transition is constructed and arranged to convey the gas stream horizontally from each immediately preceding bed to each immediately succeeding bed.

22. A horizontal pass multiple packed-bed gas scrubber for removing solute from a gas stream comprising:

an enclosure comprising wall means forming a scrubbing chamber, including a horizontal top wall of said scrubbing chamber;

a sump for holding a supply of scrubbing liquid;

pump means for pumping scrubbing liquid from said sump to said scrubbing chamber;

drain means for draining scrubbing liquid from said scrubbing chamber to said sump;

said scrubbing chamber comprising means defining a gas flow path which extends between a gas inlet where solute-containing gas enters said enclosure and a gas outlet where scrubbed gas exits said enclosure and to which the gas stream is constrained as it passes through said enclosure;

fan means for causing gas to enter said enclosure through said gas inlet, and the gas stream to move through said gas flow path and exit said enclosure through said gas outlet, said gas flow path comprising multiple, successively side-by-side, horizontal packed-beds each containing packing material occupying the bed's length and filling the bed's transverse cross sectional area, and a transition for conveying the gas stream horizontally from an immediately preceding bed to an immediately succeeding bed and reversing the direction such that the gas flow travels through said immediately succeeding bed in the opposite direction from the direction through said immediately preceding bed;

said packing material serving, when wetted by scrubbing liquid, to spread out the scrubbing liquid into an expansive interfacial area;

said scrubbing chamber further comprising distribution means for distributing scrubbing liquid pumped from said pump means throughout the packing material in said beds for thoroughly wetting the same to create throughout the packing material an expansive interfacial area for the scrubbing liquid to interface with the gas stream and accomplish efficient mass transfer removal of solute from the gas stream as it passes through said beds and thereafter conveying solute-containing scrubbing liquid to said drain means for draining the same to said sump; and wherein baffles are spaced apart along the length of each of said beds, each baffle transversely spans its bed and extends vertically from a location proximate said top wall of said scrubbing chamber into the packing material in its bed to block the flow of gas through voids between the top of the packing and said top wall of said scrubbing chamber and force gas to pass through the packing at the locations of the baffles, thereby preventing gas from bypassing the packing by flowing through such voids.

23. A horizontal pass multiple packed-bed gas scrubber as set forth in claim 22 wherein said baffles occupy vertical planes that are perpendicular to the lengths of said beds.

24. A horizontal pass multiple packed-bed gas scrubber for removing solute from a gas stream comprising:

an enclosure comprising wall means forming a generally rectangular scrubbing chamber having a horizontal bottom wall, vertical front and back side walls, vertical right and left side walls, and a removable top wall forming a cover;

a sump for holding a supply of scrubbing liquid at an elevation below that of said scrubbing chamber;

pump means for pumping scrubbing liquid from said sump to said scrubbing chamber;

drain means for draining scrubbing liquid from said scrubbing chamber to said sump;

said scrubbing chamber comprising means defining a gas flow path which extends between a gas inlet in said left side wall proximate said front side wall where solute-containing gas enters said enclosure and a gas outlet in said right side wall proximate said front side wall where scrubbed gas exits said enclosure and to which the gas stream is constrained as it passes through said enclosure;

fan means for causing gas to enter said enclosure through said gas inlet, and the gas stream to move through said gas flow path and exit said enclosure through said gas outlet, said gas flow path comprising four, successively side-by-side, parallel horizontal packed-beds arranged with their lengths extending in a direction between said front and back side walls, each bed containing packing material occupying the bed's length and filling the bed's transverse cross sectional area, and a transition that is unoccupied by packing material for conveying the gas stream horizontally from an immediately preceding bed to an immediately succeeding bed and reversing the direction such that the gas stream travels through said immediately succeeding bed in the opposite direction from the direction through said immediately preceding bed;

said packing material serving, when wetted by scrubbing liquid, to spread out the scrubbing liquid into an expansive interfacial area;

said scrubbing chamber further comprising distribution means for distributing scrubbing liquid pumped from said pump means throughout the packing material in said beds for thoroughly wetting the same to create throughout the packing material an expansive interfacial area for the scrubbing liquid to interface with the gas stream and accomplish efficient mass transfer removal of solute from the gas stream as it passes through said beds and thereafter conveying solute-containing scrubbing liquid to said drain means for draining the same to said sump; and wherein said packed-beds are parallelogram-shaped as viewed in plan, wherein a first of said packed-beds is proximate said left side wall and is preceded in the flow path by an entrance vestibule that is unoccupied by packing material and that comprises, as viewed in plan, that portion of said left side wall containing said gas inlet and an adjoining portion of said front side wall, and said entrance vestibule further comprises, as also viewed in plan, a taper that narrows in a direction away from said gas inlet and is cooperatively defined by a beginning of said first packed-bed and said adjoining portion of said front side wall, wherein a fourth of said packed-beds is proximate said right side wall and is succeeded in the flow path by a mist eliminator and an exit vestibule, in that order, said exit vestibule comprises, as viewed in plan, that portion of said right side wall containing said gas outlet and an adjoining portion of said front side wall, and said exit vestibule further comprises, as also viewed in plan, a taper that expands in a direction toward said gas outlet and is cooperatively defined by said mist eliminator and said portion of said front side wall that adjoins said right side wall.

25. A horizontal pass multiple packed-bed gas scrubber for removing solute from a gas stream as set forth in claim 24 wherein a second and a third of said packed-beds that are between said first and fourth packed-beds in the flow path are substantially equal in length and each is longer in length than said first packed-bed and than said fourth packed-bed, and said fourth packed-bed is shorter in length than said first packed-bed.

26. A horizontal pass multiple packed-bed gas scrubber as set forth in claim 25 wherein said sump is formed directly vertically beneath said scrubbing chamber by further wall means of said enclosure so that said bottom wall of said scrubbing chamber forms a top wall of said sump, said sump has four vertical side walls extending downwardly from respective side walls of said scrubbing chamber and a horizontal bottom wall forming a floor of the sump.

27. A horizontal pass multiple packed-bed gas scrubber as set forth in claim 26 wherein said fan means is disposed external to said enclosure and downstream of said gas flow path for drawing gas through the enclosure, and said pump means is disposed external to said enclosure.

28. A horizontal pass multiple packed-bed gas scrubber as set forth in claim 26 wherein said drain means is disposed at other than said packed-beds and comprises vertical drain conduits at each such transition, said vestibules and said mist eliminator.

29. A horizontal pass multiple packed-bed gas scrubber for removing solute from a gas stream comprising:

an enclosure comprising wall means forming a scrubbing chamber;

said scrubbing chamber comprising means defining a gas flow path which extends between a gas inlet where solute-containing gas enters said enclosure and a gas outlet where scrubbed gas exits said enclosure and to which the gas stream is constrained as it passes through said enclosure;

said gas flow path comprising multiple, successively side-by-side, horizontal packed-beds, each containing packing material occupying the bed's length and filling the bed's transverse cross sectional area, and a transition that is unoccupied by packing material for conveying the gas stream horizontally from an immediately preceding bed to an immediately succeeding bed and reversing the direction such that the gas stream travels through said immediately succeeding bed in the opposite direction from the direction through said immediately preceding bed;

said packing material serving, when wetted by scrubbing liquid, to spread out the scrubbing liquid into an expansive interfacial area;

said scrubbing chamber further comprising distribution means for distributing scrubbing liquid throughout the packing material in said beds for thoroughly wetting the same to create throughout the packing material an expansive interfacial area for the scrubbing liquid to interface with the gas stream and accomplish efficient mass transfer removal of solute from the gas stream as it passes through said beds; and wherein said transition presents to the gas stream entering it an entrance area that is defined by a lengthwise end of said immediately preceding bed and to the gas stream exiting it an exit area that is defined by a lengthwise beginning of said immediately succeeding bed, and wherein said end of said immediately preceding bed and said beginning of said immediately succeeding bed occupy respective vertical planes that make an obtuse angle with each other.

30. A horizontal pass multiple packed-bed gas scrubber for removing solute from a gas stream comprising:

an enclosure comprising wall means forming a scrubbing chamber;

said scrubbing chamber comprising means defining a gas flow path which extends between a gas inlet where solute-containing gas enters said enclosure and a gas outlet where scrubbed gas exits said enclosure and to which the gas stream is constrained as it passes through said enclosure;

said gas flow path comprising multiple, successively side-by-side, horizontal packed-beds, each containing packing material occupying the bed's length and filling the bed's transverse cross sectional area, and a transition that is unoccupied by packing material for conveying the gas stream from an immediately preceding bed to an immediately succeeding bed and reversing the direction such that the gas stream travels through said immediately succeeding bed in the opposite direction from the direction through said immediately preceding bed;

said packing material serving, when wetted by scrubbing liquid, to spread out the scrubbing liquid into an expansive interfacial area;

said scrubbing chamber further comprising distribution means for distributing scrubbing liquid throughout the packing material in said beds for thoroughly wetting the same to create throughout the packing material an expansive interfacial area for the scrubbing liquid to interface with the gas stream and accomplish efficient mass transfer removal of solute from the gas stream as it passes through said beds; and wherein said transition presents to the gas stream entering it an entrance area that is defined by a lengthwise end of said immediately preceding bed and to the gas stream exiting it an exit area that is defined by a beginning of said immediately succeeding bed, and wherein said end of said immediately preceding bed occupies other than a flat vertical plane that is perpendicular to the length of said immediately preceding bed, and said beginning of said immediately succeeding bed occupies other than a flat vertical plane that is perpendicular to the length of said immediately succeeding bed.

31. A horizontal pass multiple packed-bed gas scrubber for removing solute from a gas stream comprising:

an enclosure comprising wall means forming a scrubbing chamber;

said scrubbing chamber comprising means defining a gas flow path which extends between a gas inlet where solute-containing gas enters said enclosure and a gas outlet where scrubbed gas exits said enclosure and to which the gas stream is constrained as it passes through said enclosure;

said gas flow path comprising multiple, successively side-by-side, horizontal packed-beds each containing packing material occupying the bed's length and filling the bed's transverse cross sectional area, and a transition that is unoccupied by packing material for conveying the gas stream horizontally from an immediately preceding bed to an immediately succeeding bed and reversing the direction such that the gas flow travels through said immediately succeeding bed in the opposite direction from the direction through said immediately preceding bed;

said packing material serving, when wetted by scrubbing liquid, to spread out the scrubbing liquid into an expansive interfacial area;

said scrubbing chamber further comprising distribution means for distributing scrubbing liquid throughout the packing material in said beds for thoroughly wetting the same to create throughout the packing material an expansive interfacial area for the scrubbing liquid to interface with the gas stream and accomplish efficient mass transfer removal of solute from the gas stream as it passes through said beds; and wherein said immediately preceding and said immediately succeeding beds each comprises a beginning and an end, said beginning and said end of said immediately preceding bed occupy respective vertical planes that are parallel with each other but other than perpendicular to the length of said immediately preceding bed, and said beginning and said end of said succeeding bed occupy respective vertical planes that are parallel with each other but other than perpendicular to the length of said succeeding bed.

32. A horizontal pass multiple packed-bed gas scrubber for removing solute from a gas stream comprising:

an enclosure comprising wall means forming a scrubbing chamber;

said scrubbing chamber comprising means defining a gas flow path which extends between a gas inlet where solute-containing gas enters said enclosure and a gas outlet where scrubbed gas exits said enclosure and to which the gas stream is constrained as it passes through said enclosure;

said gas flow path comprising multiple, successively side-by-side, horizontal packed-beds each containing packing material occupying the bed's length and filling the bed's transverse cross sectional area, and a transition that is unoccupied by packing material for conveying the gas stream from an immediately preceding bed to an immediately succeeding bed and reversing the direction such that the gas flow travels through said immediately succeeding bed in the opposite direction from the direction through said immediately preceding bed;

said packing material serving, when wetted by scrubbing liquid, to spread out the scrubbing liquid into an expansive interfacial area;

said scrubbing chamber further comprising distribution means for distributing scrubbing liquid throughout the packing material in said beds for thoroughly wetting the same to create throughout the packing material an expansive interfacial area for the scrubbing liquid to interface with the gas stream and accomplish efficient mass transfer removal of solute from the gas stream as it passes through said beds; and wherein said transition presents to the gas stream entering it an entrance area that is defined by a lengthwise end of said immediately preceding bed and to the gas stream exiting it an exit area that is defined by a beginning of said immediately succeeding bed, and wherein said end of said immediately preceding bed occupies other than a flat vertical plane that is perpendicular to the length of said immediately preceding bed, and said beginning of said immediately succeeding bed occupies other than a flat vertical plane that is perpendicular to the length of said immediately succeeding bed.

33. A horizontal pass multiple packed-bed gas scrubber for removing solute from a gas stream comprising:

an enclosure comprising wall means forming a scrubbing chamber, including a horizontal top wall of said scrubbing chamber;

said scrubbing chamber comprising means defining a gas flow path which extends between a gas inlet where solute-containing gas enters said enclosure and a gas outlet where scrubbed gas exits said enclosure and to which the gas stream is constrained as it passes through said enclosure;

said gas flow path comprising multiple, successively side-by-side, horizontal packed-beds each containing packing material occupying the bed's length and filling the bed's transverse cross sectional area, and a transition for conveying the gas stream horizontally from an immediately preceding bed to an immediately succeeding bed and reversing the direction such that the gas flow travels through said immediately succeeding bed in the opposite direction from the direction through said immediately preceding bed;

said packing material serving, when wetted by scrubbing liquid, to spread out the scrubbing liquid into an expansive interfacial area;

said scrubbing chamber further comprising distribution means for distributing scrubbing liquid throughout the packing material in said beds for thoroughly wetting the same to create throughout the packing material an expansive interfacial area for the scrubbing liquid to interface with the gas stream and accomplish efficient mass transfer removal of solute from the gas stream as it passes through said beds; and wherein said distribution means comprises piping that is disposed proximate the tops of said beds and that is supported by baffles which are spaced apart along the length of each of said beds, which transversely span each of said beds, and which extend vertically from a location proximate said top wall of said scrubbing chamber into the packing material in each of said beds, and wherein said piping comprises low pressure drop orifices through which scrubbing liquid is emitted from the piping into the packing material.

34. A horizontal pass multiple packed-bed gas scrubber as set forth in claim 33 wherein said baffles extend into the packing material at least as far as the elevation of said piping.

35. A horizontal pass multiple packed-bed gas scrubber for removing solute from a gas stream comprising:

an enclosure comprising wall means forming a scrubbing chamber, including a horizontal top wall of said scrubbing chamber;

said scrubbing chamber comprising means defining a gas flow path which extends between a gas inlet where solute-containing gas enters said enclosure and a gas outlet where scrubbed gas exits said enclosure and to which the gas stream is constrained as it passes through said enclosure;

said gas flow path comprising multiple, successively side-by-side, horizontal packed-beds each containing packing material occupying the bed's length and filling the bed's transverse cross sectional area, and a transition for conveying the gas stream horizontally from an immediately preceding bed to an immediately succeeding bed and reversing the direction such that the gas flow travels through said immediately succeeding bed in the opposite direction from the direction through said immediately preceding bed;

said packing material serving, when wetted by scrubbing liquid, to spread out the scrubbing liquid into an expansive interfacial area;

said scrubbing chamber further comprising distribution means for distributing scrubbing liquid throughout the packing material in said beds for thoroughly wetting the same to create throughout the packing material an expansive interfacial area for the scrubbing liquid to interface with the gas stream and accomplish efficient mass transfer removal of solute from the gas stream as it passes through said beds; and wherein baffles are spaced apart along the length of each of said beds, each baffle transversely spans its bed and extends vertically from a location proximate said top wall of said scrubbing chamber into the packing material in its bed to block the flow of gas through voids between the top of the packing and said top wall of said scrubbing chamber and force gas to pass through the packing at the locations of the baffles, thereby preventing gas from bypassing the packing by flowing through such voids.

36. A horizontal pass multiple packed-bed gas scrubber as set forth in claim 35 wherein said baffles extend into, the packing material at least as far as the elevation of said distribution means.

37. A horizontal pass multiple packed-bed gas scrubber for removing solute from a gas stream comprising:

an enclosure comprising wall means forming a scrubbing chamber;

said scrubbing chamber comprising means defining a gas flow path which extends between a gas inlet where solute-containing gas enters said enclosure and a gas outlet where scrubbed gas exits said enclosure and to which the gas stream is constrained as it passes through said enclosure;

said gas flow path comprising multiple, successively side-by-side, horizontal packed-beds each containing packing material occupying the bed's length and filling the bed's transverse cross sectional area, and a transition that is unoccupied by packing material for conveying the gas stream horizontally from an immediately preceding bed to an immediately succeeding bed and reversing the direction such that the gas flow travels through said immediately succeeding bed in the opposite direction from the direction through said immediately preceding bed;

said packing material serving, when wetted by scrubbing liquid, to spread out the scrubbing liquid into an expansive interfacial area;

said scrubbing chamber further comprising distribution means for distributing scrubbing liquid throughout the packing material in said beds for thoroughly wetting the same to create throughout the packing material an expansive interfacial area for the scrubbing liquid to interface with the gas stream and accomplish efficient mass transfer removal of solute from the gas stream as it passes through said beds; and wherein the ratio of total packed length to mean gas flow path length is no less than 0.77.

* * * * *